UNITED STATES PATENT OFFICE.

KARL SCHIRMACHER AND HERMANN LANDERS, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

RED VAT DYE.

No. 892,897.

Specification of Letters Patent.

Patented July 7, 1908.

Application filed March 13, 1908. Serial No. 420,863.

*To all whom it may concern:*

Be it known that we, KARL SCHIRMACHER, Ph. D., and HERMANN LANDERS, Ph. D., chemists, citizens of the Empire of Germany, and residing at Höchst-on-the-Main, Germany, have invented certain Improvements in Making Red Vat Dyestuffs, of which the following is a specification.

We have found that the hitherto unknown halogen-derivatives of the meta-metadimethyl-thioindigo which have the constitutional formula:

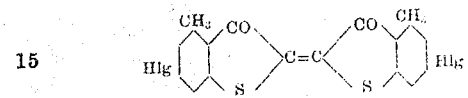

are red coloring matters, the dyeings of which are distinguished by their beautiful shades and their fastness. These new dyestuffs may be obtained by fusing the methyl-halogen-phenylthioglycollic-ortho-carboxylic acid of the constitution $(CH_3:Hlg:SCH_2COOH:COOH = 3:5:1:2)$ with alkalies and treating the methylhalogenoxythionaphthene-carboxylic acids thus obtained with oxydizing agents.

The process may be carried out, for instance, as follows: 21.6 parts by weight of the chloronitrotoluylic acid $(CH_3:Cl:COOH_2:NO = 3:5:2:1)$ (see Liebig's *Annale der Chemie* 274 p. 298) are dissolved in 5.6 parts by weight of soda and the necessary quantity of water, a concentrated solution of 11 parts by weight of sodium disulfid ($Na_2S_2$) is added and the mixture is boiled on a reflux cooling apparatus. When cold, the mass is acidified with acetic acid and the precipitated chloroamino-orthotoluylic acid $(CH_3:Cl:COOH:NH_2 = 3:5:2:1)$ is filtered. In order to purify, it may be dissolved with soda and reprecipitated by means of acetic acid. The acid crystallizes from water, in which it is soluble with some difficulty, in form of fine needles. 17.6 parts by weight of this m-chloro-m-amino-o-toluylic acid are diazotized with 25 parts by weight of hydrochloric acid and 6.9 parts by weight of nitrite, and this diazo solution is introduced into a solution of 18 parts by weight of potassium xanthogenate and 40 parts by weight of soda. After several hours stirring 15 parts by weight of sodium chloroacetate and 25 parts by weight of caustic soda lye of 40° Bé. strength are added and the solution heated for some hours to 100° C. At the surface of the solution small quantities of a violet blue dyestuff separate, which turn to red when acidified. When cold, the solution is filtered and then the m-methyl-m-chloro-phenyl-thioglycoilic-ortho-carboxylic acid is

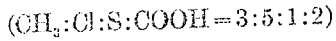

precipitated by adding hydrochloric acid and common salt. The acid separating as a weak mass soon becomes solid. It may be re-crystallized from water and thus obtained in the form of fine nearly colorless needles.

To produce the m-methyl-m-chloro-oxy-thionaphthene-carboxylic acid, 20 parts by weight of methyl-chloro-phenylthioglycoilic-o-carboxylic acid are heated to about 180--190° C. with a mixture of 100 parts by weight of caustic soda and 10 parts by weight of water. The melt, at first intensively colored, becomes successively clearer and finally very light-yellow. When cold, the melt is dissolved in water; then by adding to the cold solution hydrochloric acid the methyl-chloro-oxythionaphthene-carboxylic acid is precipitated in the form of white flakes which become a reddish color when exposed to the air. If this acid be heated with mineral acids it splits off carbonic acid and the methyl-chloro-oxythionaphthene is formed which is very difficultly soluble in water and forms when recrystallized from water fine brilliant needles.

In order to obtain the vat dyestuff from the methyl-chloro-oxythionaphthene carboxylic acid, the alkali melt may be used directly by dissolving it with water and adding a solution of potassium ferricyanid until there is an excess of it. The new dyestuff separates in beautiful red flakes. In a dry state it is a red powder which dissolves in an alkaline hydrosulfite solution thus forming a vat. This dye vat dyes wool and cotton in fast alizarin pink shades. The dyestuff is not soluble in water, ether and alcohol, soluble with a red color in hot glacial acetic acid, nitrobenzene, anilin and chloroform, with a green color in concentrated sulfuric acid.

Having now described our invention, what we claim is:

1. As new products the dimethyl-dihalogen derivatives of thioindigo, the constitution of which corresponds to the formula:

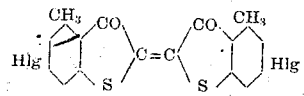

red powders, insoluble in water, alcohol and ether, soluble in hot nitrobenzene and glacial acetic acid with a red color, in sulfuric acid with a green color; when dissolved with alkaline hydrosulfite, they form a yellow colored vat, which dyes wool and cotton in fast pink shades.

2. As a new product the dimethyl-dichlor-thioindigo, the constitution of which corresponds to the formula:

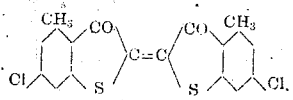

it is a red powder, insoluble in alcohol, ether and water, soluble in hot nitrobenzene, glacial acetic acid and chloroform with a red color, in concentrated sulfuric acid with a green color, dissolved with alkaline hydrosulfite it forms a yellow colored vat dyeing wool and cotton in beautiful fast alizarin-pink shades.

In testimony, that we claim the foregoing as our invention, have signed our names in presence of two subscribing witnesses.

KARL SCHIRMACHER.
HERMANN LANDERS.

Witnesses:
JEAN GRUND,
CARL GRUND.